(12) United States Patent
Cammert et al.

(10) Patent No.: US 10,089,362 B2
(45) Date of Patent: Oct. 2, 2018

(54) SYSTEMS AND/OR METHODS FOR INVESTIGATING EVENT STREAMS IN COMPLEX EVENT PROCESSING (CEP) APPLICATIONS

(71) Applicant: Software AG, Darmstadt (DE)

(72) Inventors: Michael Cammert, Wettenberg (DE); Christoph Heinz, Weimar-Niederweimar (DE); Daniel Schaefer, Ober-Moerlen (DE); Tobias Riemenschneider, Schwalmstadt (DE); Juergen Kraemer, Marburg (DE)

(73) Assignee: SOFTWARE AG, Darmstadt (DE)

( * ) Notice: Subject to any disclaimer, the term of this patent is extended or adjusted under 35 U.S.C. 154(b) by 632 days.

(21) Appl. No.: 14/458,806

(22) Filed: Aug. 13, 2014

(65) Prior Publication Data

US 2016/0048565 A1   Feb. 18, 2016

(51) Int. Cl.
   *G06F 17/30*   (2006.01)
(52) U.S. Cl.
   CPC .............................. *G06F 17/30516* (2013.01)
(58) Field of Classification Search
   None
   See application file for complete search history.

(56) References Cited

U.S. PATENT DOCUMENTS

| 7,783,694 | B2 | 8/2010 | Perng et al. |
| 8,078,556 | B2 | 12/2011 | Adi et al. |
| 8,266,351 | B2 | 9/2012 | Schöning et al. |
| 8,412,732 | B2 | 4/2013 | Crocker et al. |
| 8,453,159 | B2 | 5/2013 | Appelbaum et al. |
| 8,640,089 | B2 | 1/2014 | Bates et al. |

(Continued)

FOREIGN PATENT DOCUMENTS

EP   2 871 577   5/2015

OTHER PUBLICATIONS

Gloria Chatzopoulou et al., "Query Recommendations for Interactive Database Exploration," Scientific and Statistical Database Management, Jun. 2009, pp. 3-18.

(Continued)

*Primary Examiner* — Christopher J Raab
(74) *Attorney, Agent, or Firm* — Nixon & Vanderhye P.C.

(57) ABSTRACT

Certain example embodiments relate to techniques for investigating event streams in complex event processing (CEP) environments. Input events from one or more input event streams and query registration-related events from a registration event stream are received. Query registration-related events are associated with actions taken with respect to queries performed on the input event stream(s). Event-based profiles are developed by subjecting the received input events to a profiling CEP engine. Event-based profiles include data mining related and/or statistical characteristics for each input event stream. Query-based profiles are developed by subjecting the received query registration-related events to the CEP engine. Query-based profiles include data indicative of how relevant the queries performed on the input event stream(s) are and/or how those queries are relevant to the input event stream(s) on which they are performed. Query registration-related events are generated when a query on the input event stream(s) is registered, deregistered, etc.

24 Claims, 11 Drawing Sheets

(56) References Cited

U.S. PATENT DOCUMENTS

| | | |
|---|---|---|
| 8,655,825 B2 | 2/2014 | Roesch et al. |
| 2009/0292729 A1 | 11/2009 | Blount et al. |
| 2010/0017379 A1 | 1/2010 | Naibo et al. |
| 2010/0131556 A1* | 5/2010 | Meijer .................... G06F 9/542 707/771 |
| 2011/0010209 A1* | 1/2011 | McNally .............. G06N 99/005 705/7.11 |
| 2011/0125762 A1 | 5/2011 | Schöning et al. |
| 2011/0178775 A1 | 7/2011 | Schöning et al. |
| 2011/0202496 A1 | 8/2011 | Klinger et al. |
| 2012/0166421 A1 | 6/2012 | Cammert et al. |
| 2013/0046725 A1 | 2/2013 | Cammert et al. |
| 2013/0110745 A1 | 5/2013 | Zhang |
| 2013/0138686 A1* | 5/2013 | Takahashi ......... G06F 17/30516 707/769 |
| 2014/0025700 A1 | 1/2014 | Schöning |
| 2014/0078163 A1 | 3/2014 | Cammert et al. |
| 2014/0237289 A1* | 8/2014 | de Castro Alves ... G06F 11/202 714/11 |
| 2014/0237487 A1* | 8/2014 | Prasanna ............. G06F 11/3089 719/318 |
| 2014/0351287 A1* | 11/2014 | Wolf ................. G06F 17/30424 707/779 |
| 2015/0100616 A1* | 4/2015 | Imamura ............... G06F 9/4856 709/201 |

OTHER PUBLICATIONS

Mitch Cherniack et al., "Expressing User Profiles for Data Recharging," Personal Communications IEEE, vol. 8, Issue 4, Aug. 2001, pp. 32-38.

Hazem Elmeleegy et al., "Mashup Advisor: A Recommendation Tool for Mashup Development," IEEE International Conference on Web Services, Sep. 2008, pp. 337-344.

Kia Teymourian et al., "Fusion of Event Stream and Background Knowledge for Semantic-Enabled Complex Event Processing," Oct. 2011, pp. 1-5.

Kia Teymourian et al., "Semantic Processing of Sensor Event Stream by Using External Knowledge Base," retrieved Aug. 13, 2014, pp. 1-6.

Davide F. Barbieri et al., "Incremental Reasoning on Streams and Rich Background Knowledge," The Semantic Web: Research and Applications: $7^{th}$ Extended Semantic Web Conference, May 2010, pp. 1-15.

Ugur Cetintemel et al., "Query Steering for Interactive Data Exploration," $6^{th}$ Biennial Conference on Innovative Data Systems Research, Jan. 2013, pp. 1-4.

* cited by examiner

```
<eda:Event xmlns:eda="http://namespaces.softwareag.com/EDA/Event">
  <eda:Header>
    <eda:Type>{http://namespaces.softwareag.com/EDA}QueryRegistration</eda:Type>
    <eda:Start>2014-01-01T13:47:23Z</eda:Start>
    <eda:Kind>Event</eda:Kind>
  </eda:Header>
  <eda:Body>
    <p1:QueryRegistration xmlns:p1="http://namespaces.softwareag.com/EDA">
      <p1:QueryID>FilterQuery</p1:QueryID>
      <p1:QueryString>SELECT * FROM Stream1 WHERE attribute1=50</p1:QueryString>
      <p1:RegistrationType>register</p1:RegistrationType>
      <p1:UserGroup>Accounting</p1:UserGroup>
      <p1:UserID>hg14</p1:UserID>
    </p1:QueryRegistration>
  </eda:Body>
</eda:Event>
```

Fig. 4

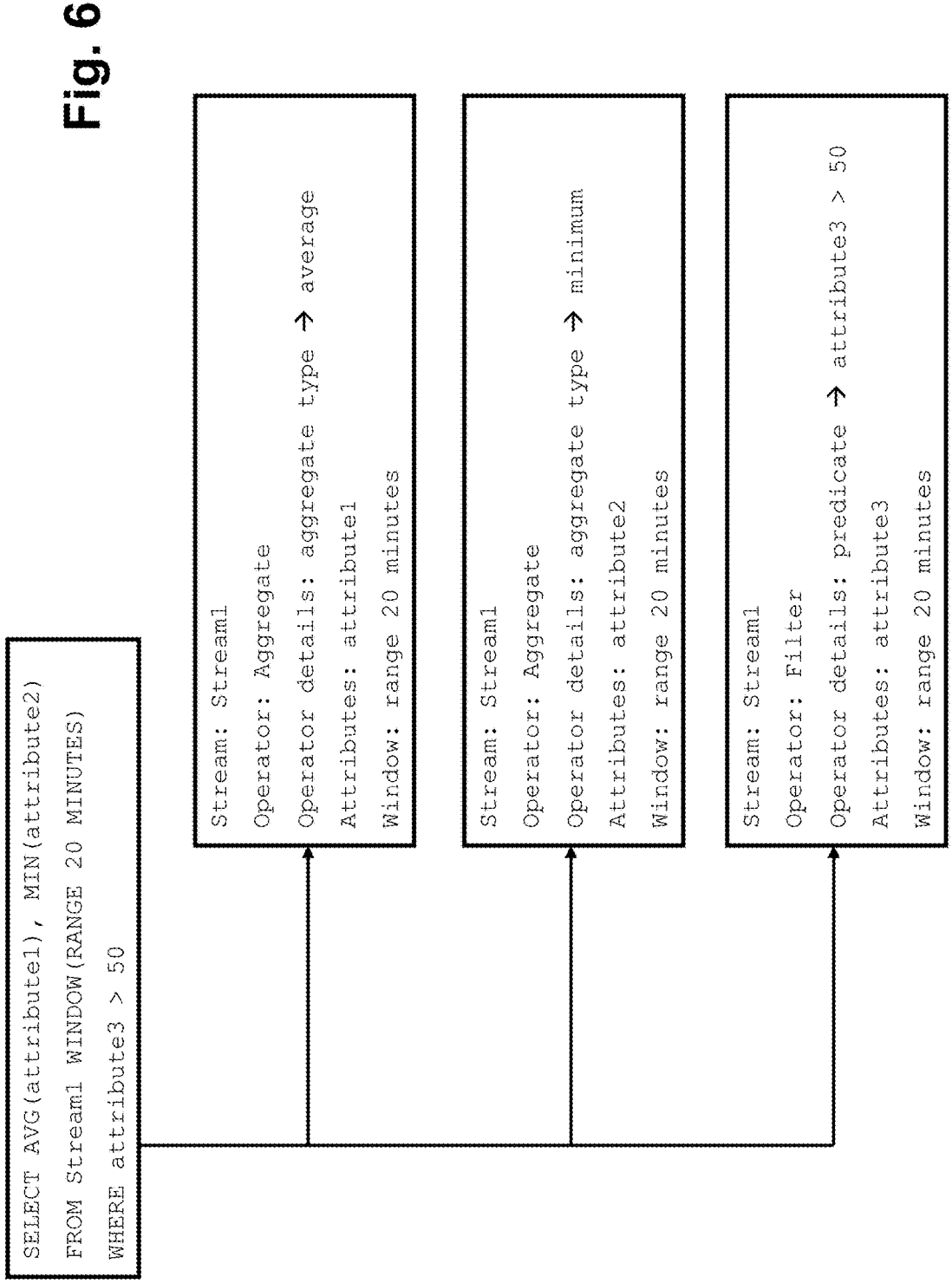

```xml
<eda:Event xmlns:eda="http://namespaces.softwareag.com/EDA/Event">
  <eda:Header>
    <eda:Type>{http://namespaces.softwareag.com/EDA}QueryProfile</eda:Type>
    <eda:Start>2014-01-01T14:00:00Z</eda:Start>
    <eda:End>2014-01-01T15:00:00Z</eda:End>
    <eda:Kind>Event</eda:Kind>
  </eda:Header>
  <eda:Body>
    <p1:QueryProfile xmlns:p1="http://namespaces.softwareag.com/EDA">
      <p1:StreamID>Transaction</p1:StreamID>
      <p1:NumberOfReferringQueries>11</p1:NumberOfReferringQueries>
      <p1:MostFrequentJoinAttribute>volume</p1:MostFrequentJoinAttribute>
      <p1:AvgWindowSize>90000</p1:AvgWindowSize>
      <p1:MinWindowSize>60</p1:MinWindowSize>
      <p1:MaxWindowSize>72000</p1:MaxWindowSize>
    </p1:QueryProfile>
  </eda:Body>
</eda:Event>
```

Fig. 7

```xml
<eda:Event xmlns:eda="http://namespaces.softwareag.com/EDA/Event">
    <eda:Header>
        <eda:Type>{http://namespaces.softwareag.com/EDA}StreamProfile</eda:Type>
        <eda:Start>2014-01-01T14:00:00Z</eda:Start>
        <eda:End>2014-01-01T15:00:00Z</eda:End>
        <eda:Kind>Event</eda:Kind>
    </eda:Header>
    <eda:Body>
        <p1:StreamProfile xmlns:p1="http://namespaces.softwareag.com/EDA">
            <p1:StreamID>Transaction</p1:StreamID>
            <p1:Attribute>Volume</p1:Attribute>
            <p1:Avg>119.34</p1:Avg>
            <p1:Variance>17.89</p1:Variance>
            <p1:NumberOfModes>3</p1:NumberOfModes>
            <p1:LinearRegression>4.69*price+39.41</p1:LinearRegression>
        </p1:StreamProfile>
    </eda:Body>
</eda:Event>
```

SYSTEMS AND/OR METHODS FOR INVESTIGATING EVENT STREAMS IN COMPLEX EVENT PROCESSING (CEP) APPLICATIONS

TECHNICAL FIELD

Certain example embodiments described herein relate to techniques for enabling stream profiling based on streams and queries in Complex Event Processing (CEP) systems. More particularly, certain example embodiments described herein relate to a system and/or method to support stream-based and/or query-based profiling techniques based on event stream characteristics and/or query registration events.

BACKGROUND AND SUMMARY OF EXAMPLE EMBODIMENTS

Today, companies have to deal with an ever-increasing flood of business-relevant data. Indeed, because of technological advances more and more data is being produced on a daily basis. Computer applications based on those streams of data often have a time-sensitive or time-critical nature. It oftentimes is the case that the data needs to be processed and analyzed as fast as possible in order to obtain a competitive edge. Applications that are able to work in this manner are of potential interest in a variety of different industries such as, for example, for algorithmic trading in the finance sector, network monitoring in Information Technology (IT) departments, delivery tracking for logistics purposes, monitoring of business processes, etc.

Stream processing typically follows the pattern of continuous queries, which may be thought of in some instances as being queries that execute for a potentially indefinite amount of time on data that is generated or changes very rapidly. Such data are called streams, and streams oftentimes comprise events. Such streams often exist in real-world scenarios, e.g., as temperature readings from sensors placed in warehouses or on trucks for logistics purposes, weather data, entrance control systems (where events are generated whenever a person enters or leaves, for instance), etc. Events may include attributes (also sometimes referred to as a payload) such as, for example, the value of temperature readings and metadata (sometimes referred to as a header or header data) such as, for example, creation date, validity period, and quality of the event. Possible events occurring in an environment typically are schematically described by so-called event types, which in some respects are somewhat comparable to table definitions in relational databases.

Streams may in certain scenarios be organized in channels that in turn are implemented by an event bus. Channels and event types in this sense may be considered orthogonal concepts, e.g., in the sense that events of the same event type might be communicated via different channels.

Complex Event Processing (CEP) is an approach to handling the challenges associated with processing and analyzing huge amounts of data arriving with high frequencies. As will be appreciated from the above, in this context, the arriving data is classified as an event stream. CEP systems are designed to receive multiple streams of events and analyze them in an incremental manner with very low (e.g., near-zero) latency. Events may be evaluated and aggregated to form derived (or complex) events (e.g., by an engine or so-called event processing agents). Event processing agents can be cascaded such that, for example, the output of one event processing agent can be the input of another event processing agent. In other words, while the data is streaming in, it may be analyzed on-the-fly, and corresponding analytical results may be forwarded to subsequent consumers. Therefore, a CEP system need not necessarily persist the data it is processing.

Thus, CEP in general may be thought of as a processing paradigm that describes the incremental, on-the-fly processing of event streams, typically in connection with continuous queries that are continuously evaluated over event streams. Moreover, CEP analysis techniques may include, for example, the ability to perform continuous queries, identify time-based relations between events by applying windowing (e.g., through XQuery), etc., with the aid of processing resources such as at least one processor and a memory. See, for example, U.S. Pat. Nos. 8,640,089 and 8,266,351, as well as U.S. Publication Nos. 2014/0078163, 2014/0025700, and 2013/0046725, the entire contents of each of which are hereby incorporated herein by reference.

The development of a CEP application typically comprises several main steps. First, the user connects to a set of streams that continuously deliver events. Second, the user defines the business logic for analyzing the event streams. Third, the user defines how to deal with the results.

Unfortunately, it oftentimes is challenging to define the business logic. For instance, the analysis of data sources typically is not a straightforward process where the targets are already predefined. Instead, it oftentimes is more an iterative process, with the analysis steps being aligned to the characteristics of the data source. A common first step is to derive some basic characteristics of the data source before successively zooming into the data and gaining deeper knowledge. In the CEP context, the analysis of event streams can be even more challenging. For example, the user oftentimes cannot easily examine an arbitrary history of the stream to obtain some starting points for further analysis or follow-up, e.g., because such data is not persisted or readily re-creatable. Nor is it straightforward for a user to traverse the data multiple times, e.g., for similar reasons. Although the user can connect to the stream and from that point on obtain the events, ad hoc analysis can be difficult (e.g., for a programmer who might not have a detailed sense of the business needs, requirements, potential tuning points, etc.), and post hoc analysis may not be possible because a connection to a stream generally will not provide access to its previous segments because doing so would be tantamount to providing events that occurred in the past.

Thus, it will be appreciated that it would be desirable to overcome these and/or other problems. For instance, it will be appreciated that it would be desirable to address issues associated with CEP developers facing event streams with unknown characteristics, e.g., by providing tools that assist in the definition of business logic, stream analysis, and generation of output.

Certain example embodiments help address these and/or other needs. For instance, certain example embodiments assist a CEP developer by providing event stream profiles. And by providing the developer with a set of profiles of the available event streams, the operational CEP queries can be defined with potentially more reliable and deeper knowledge about a stream's behavior.

One aspect of certain example embodiments relates to enabling stream profiling based on streams and queries in CEP systems.

Another aspect of certain example embodiments relates to emitting query registration events from the CEP engine to the event bus so that a stream profiler component can assess and analyze which streams are involved in which type of queries which, in turn, allows for an assessment and analysis of the stream's relevance.

Another aspect of certain example embodiments relates to stream-based and/or query-based profiling approaches, that potentially provide(s) the developer with a better understanding of the available event streams. Such profiles optionally may be visualized using the CEP engine's integrated development environment (IDE) or other software application developers can use to develop CEP software.

In certain example embodiments, a method of profiling event streams received from an event bus is provided. Input events from one or more input event streams emitted to the event bus are received. Query registration-related events from a registration event stream emitted to the event bus are received, with the query registration-related events being associated with actions taken with respect to queries performed on the one or more input event streams. Event-based profiles are developed by subjecting the received input events to a profiling CEP engine, with the profiling CEP engine operating in connection with processing resources including at least one processor, and with the event-based profiles including data mining related characteristics and/or statistical characteristics for each said input event stream. Query-based profiles are developed by subjecting the received query registration-related events to the CEP engine, with the query-based profiles including data indicative of how relevant the queries performed on the one or more input event streams are and/or how those queries are relevant to the one or more input event streams on which they are performed. The event-based profiles and the query-based profiles are stored to a non-transitory computer readable storage medium. Query registration-related events are generated at least each time a query on the one or more input event streams is registered or deregistered.

In certain example embodiments, there is provided a stream profiler computer system comprising processing resources including at least one processor and an interface to an event bus over which events are receivable. The system further comprises a profiling CEP engine that, in cooperation with the processing resources, is configured to at least: receive input events from one or more input event streams emitted to the event bus; receive query registration-related events from a registration event stream emitted to the event bus, the query registration-related events being associated with actions taken with respect to queries performed on the one or more input event streams; develop event-based profiles from the received input events, the event-based profiles including data mining related characteristics and/or statistical characteristics for each said input event stream; develop query-based profiles from the received query registration-related events, the query-based profiles including data indicative of how relevant the queries performed on the one or more input event streams are and/or how those queries are relevant to the one or more input event streams on which they are performed; and store the event-based profiles and the query-based profiles to a non-transitory computer readable storage medium of the stream profiler computer system. Query registration-related events are generated at least each time a query on the one or more input event streams is registered or deregistered.

According to certain example embodiments, a CEP system, comprising an event bus, a production CEP engine, a development environment, and the stream profiler computer system described herein may be provided.

Similarly, non-transitory computer readable storage mediums tangibly storing instructions for performing the above-summarized and/or other approaches also are provided by certain example embodiments, as well as corresponding computer programs.

These features, aspects, advantages, and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which:

FIG. 4 is an example XML-based representation for registering a filter query in accordance with an example embodiment;

FIG. 6 illustrates how a query registration event can be split into three different stream/operator events in accordance with certain example embodiments;

FIG. 7 is an example XML-based representation of an illustrative query profile in accordance with an example embodiment;

FIG. 9 is an example XML-based representation of an illustrative stream profile in accordance with an example embodiment;

DETAILED DESCRIPTION OF EXAMPLE EMBODIMENTS

Figure 1:
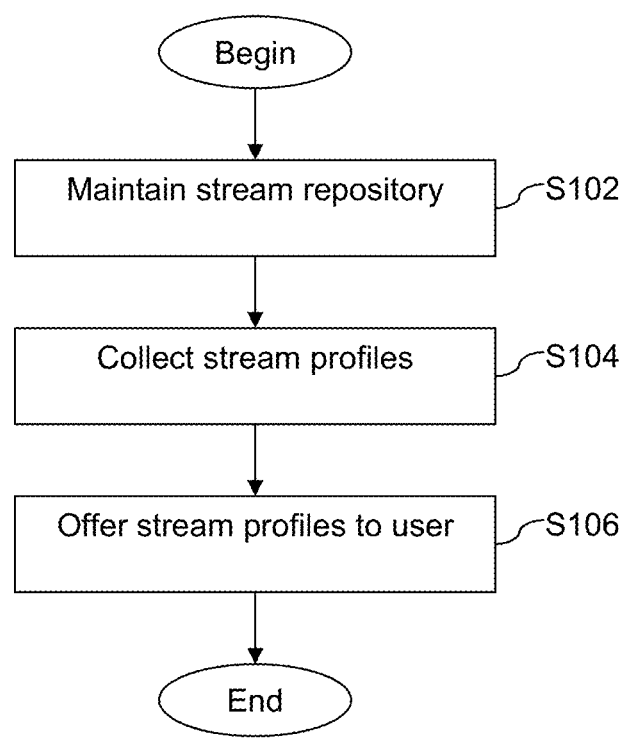
FIG. 1 is a flowchart with a high-level overview of the basic workflow of certain example embodiments.

Certain example embodiments help address the challenges associated with Complex Event Processing (CEP) developers encountering streams with unknown characteristics. Certain example embodiments provide an intelligent, easy-to-use tool that allows for characteristics of an event stream and typical analysis patterns for events observed in the past to be investigated. This investigative tool in turn helps provide information that gives the user a concise and well-founded starting point for further analyzing an event stream, e.g., potentially revealing additional and/or alternative analysis possibilities of which the user otherwise might not have been aware.

Certain example embodiments may include some or all of the following and/or other aspects in any suitable combination, sub-combination, or combination of sub-combinations:

Event-based stream profiling: For each event stream, a statistical profile may be determined. This profile may describe characteristics of the event stream such as, for example, outliers, most relevant attributes, data distribution(s), and/or the like.

Query-based stream profiling: Additional profile information may be derived based on past user behavior. For example, the queries other users have used to analyze the stream may form the basis of such profile information. By knowing how others have examined a stream before, the user may be provided with a sense of at least some ways the stream can be connected to other streams, where in the stream relevant information is hidden, etc.

Time-dependent profiling: A stream is potentially unbounded and also is likely to change its characteristics over time. For that reason, event-based as well as stream-based profiles may be maintained for different time portions of the stream. It oftentimes will be the case that recent tendencies of the stream will be more important than older ones. Therefore, the profiles for recent timeframes may be deemed to have a higher accuracy than profiles associated with older timeframes.

Comparison of profiles: The different profiles may be compared to each other to reveal additional tendencies of the event stream. For example, the comparison of event- and query-based profiles over different timeframes may allow the user to investigate the effects changing stream characteristics have on related queries.

Up-to-date profiles: As an event stream may quickly change its characteristics, there is a risk that the user may base his/her decisions on an outdated profile. Therefore, event-based as well as query-based profiles may be continuously computed in the background, e.g., to help ensure that the latest changes of the stream are captured. CEP technology may be leveraged for this purpose.

Integration into development workflow: A CEP developer may be provided with an integrated development environment (IDE) for developing a CEP application. The stream investigation component of certain example embodiments may be seamlessly embedded into such an IDE, e.g., so that the developer can easily access the profile of a stream, investigate the past stream characteristics, etc.

As will be appreciated from the description above, an event stream may be thought of as a potentially unbounded sequence of events with new events arriving continuously. An event generally comprises a payload of data associated with temporal information. This temporal information may describe when the event has occurred (e.g., an airplane has landed at 3 pm, a credit card transaction is confirmed at 10 am, or a truck has arrived at the shop at 9 am). Events of an event stream are of the same type, e.g., a credit card transaction stream may include only credit card transactions. An event comprises a number of attributes describing the data payload plus temporal information, which is typically a timestamp. Typically, an event stream will be characterized by high volumes and high rates and therefore is difficult if not impossible to persist.

An Event-Driven Architecture (EDA) is an architecture that captures the production and consumption of event streams and the reactions to those events. Components within an EDA are designed to process events in an event-driven manner, e.g., in a direct manner when the event arrives. An Event Bus may be thought of as a central bus for all event streams within an EDA. Publishers can connect their stream to the bus so that the events are published on the bus. Similarly, subscribers can subscribe to the producer streams being available on the bus.

A CEP system, as an EDA, may connect to event streams and continuously receive the corresponding incoming events. The event streams may be analyzed via continuous queries. Such queries may be registered at the system and may run continuously. Once a continuous query is registered over an event stream, it may be evaluated for each incoming event, as appropriate. For example, a continuous query could filter all credit card transactions with a volume above $20,000, determine all planes that have landed in the last hour, etc. Thus, the query may be thought of as residing in the system even though the analyzed events are transient. Because of this processing paradigm, it is not necessary to store the event stream. Moreover, as indicated above, it oftentimes would not be feasible to persist such data, as the event stream continuously produces high volumes of events that conceivably could involve hundreds of thousands events per second. The sheer amount of data, and the rate of at which it streams in, thus would be quite difficult to manage from a storage perspective.

As mentioned, a query may receive events from the moment it is registered. Therefore, the evaluation of a continuous query over an event stream may be thought of as being similar to listening to a radio channel: The moment the listener turns on the radio, the broadcasted audio stream is received. As a consequence continuous queries cannot access previous portions of the stream.

Continuous queries may be structured in a number of different ways and potentially using a number of different languages. One popular approach is a language based on SQL. Certain example embodiments are described in connection with queries formulated in SQL, but it will be appreciated that other languages can be used as well. For instance, certain example embodiments may be adapted to work with other language approaches such as, for example, rule-based languages.

Certain example embodiments allow a CEP developer to investigate an event stream using continuous queries or the like, e.g., in connection with a stream repository and stream profiling. The stream repository of certain example embodiments maintains metadata about relevant event streams accessed by CEP users. Each time a user connects to a new event stream, a new stream entry is added to the repository. For this entry, a profiling component is started, and it automatically collects (in the background) details about that selected event stream. This profile information may be continuously maintained. The user can use an interface of the IDE, e.g., to browse through the stream repository and examine profile information of selected streams.

The stream profiling component of certain example embodiments may be responsible for collecting profile information of an event stream. Two information sources may be examined for that purpose, namely, the event stream itself (including the attribute values of the events and their associated temporal information), and the queries accessing that event stream. Event-based profiling may run different data mining and statistical algorithms over the attributes of the event stream, e.g., in order to reveal the characteristics of the events. This may include, for example, basic characteristics like averages and variances of attributes. It also may include more complex characteristics such as, for example, the seasonal variations of an attribute (e.g., through the use of correlation matrices, chi-square analysis, etc.), dependencies between attributes (e.g., through T-tests, Z-tests, etc.). In certain example embodiments, the set of mining algorithms is not fixed and instead can incorporate arbitrary algorithms that allow for a well-defined stream profiling. In this vein, the statistical analysis and data mining approaches of certain example embodiments may be extensible and customizable. Stream mining may include incremental, on-the-fly computation of statistical/analytic models of event streams. Such models may be approximated, as an exact computation may require multiple passes over the stream, which may be difficult or impossible in some CEP applications. Query-based profiling may help in deriving the relevance of an event stream by examining how often it is analyzed by CEP users, which types of queries are registered over that stream, etc. Therefore, the queries of the CEP users may be analyzed with respect to included event streams and analysis steps. As the characteristics and relevance of an event stream may change over time, the lifetime of a query also may be examined.

The profiling component of certain example embodiments may maintain for each event stream event-based and query-based profiles. To allow the user to browse the development of the stream over time, the profiling component of certain example embodiments additionally or alternatively may maintain profiles over different timeframes. Still further, the two types of profiles may be related to each other, e.g., so that the user can investigate the effects of changing stream characteristics on the queries.

FIG. 1 is a flowchart with a high-level overview of the basic workflow of certain example embodiments. In step S102, a stream repository is maintained. Stream profiles are collected in step S104. Those and/or other stream profiles are offered to the user for analysis, etc., in step S106.

Example Implementation

An example implementation will now be provided. The stream investigation component of certain example embodiments works in connection with a CEP system and an EDA.

Figure 2:
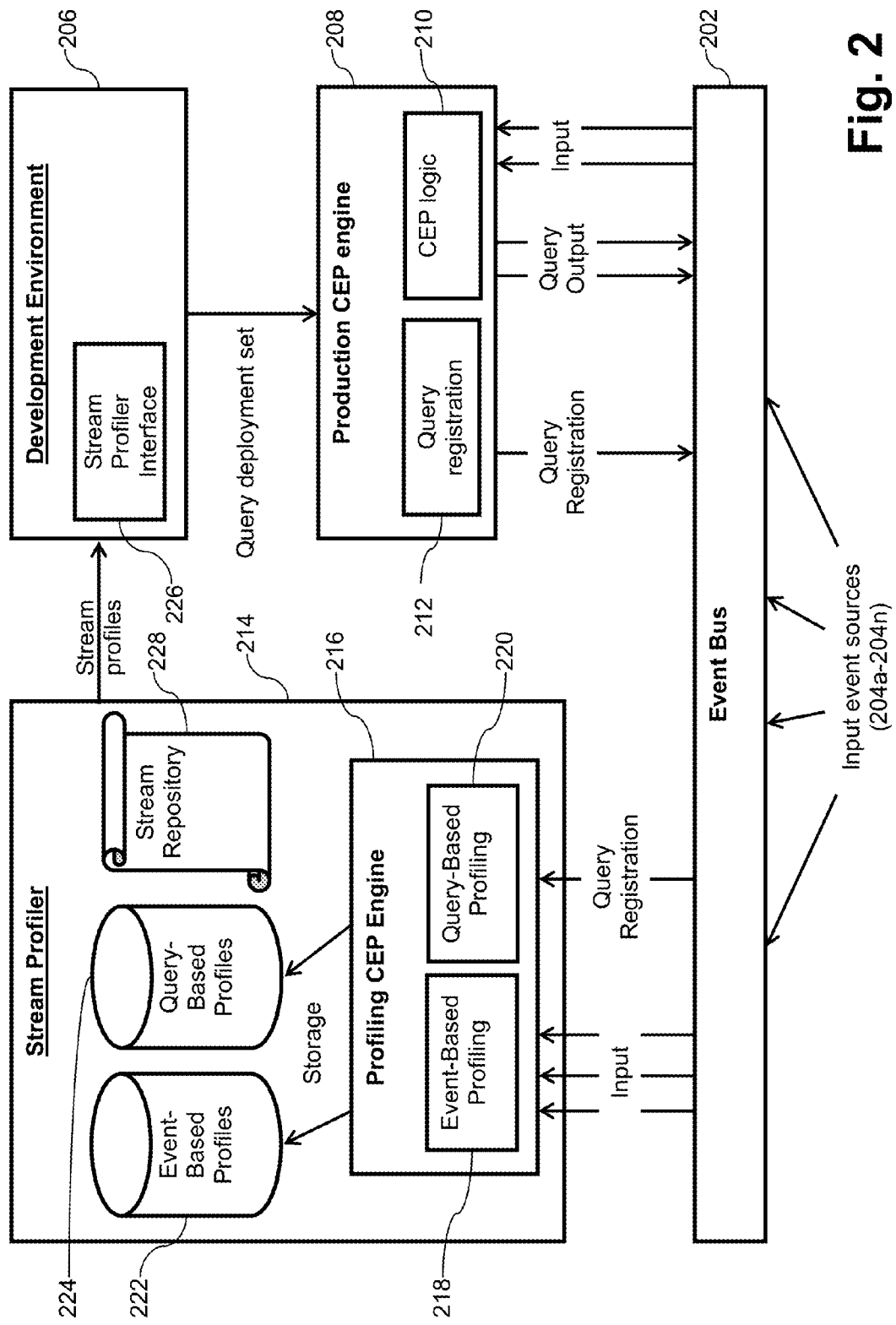
FIG. 2 is a block diagram of a CEP system that in which the stream investigation components of certain example embodiments operate.

FIG. 2 is a block diagram of a CEP system that in which the stream investigation components of certain example embodiments operate. Interaction patterns also are shown therein. As will be appreciated from the above, the event bus 202 is the main transport channel for the event streams within the event-driven architecture. Event sources 204a-204n are connected to the event bus 202, and they send the events over that transport channel. A CEP developer can use the IDE 206 to develop continuous queries that run over those event streams. The developer deploys these queries to the production CEP system 208, and the CEP logic 210 may be persisted thereon (e.g., in a suitable non-transitory computer readable storage medium). The production CEP system 208 registers and executes those queries (e.g., using the query registration and event generation component 212, which may include processing resources such as, for example, at least one processor, a memory, etc.), and publishes the query results on the Event Bus. During query deployment, the production CEP system 208 additionally publishes a notification that a query has been registered. A notification is also sent if a query has been removed or updated. Such notifications comprise an event stream. Thus, the production CEP system 208 produces a query registration stream. This stream is also published on the event bus 202 so that the stream profiler component 214 can subscribe to it. As will be described in greater detail below, this query registration stream serves as a base for deriving stream profiles.

The Stream Profiler 214 subscribes to the query registration stream and also the streams of event sources referenced in the queries. The Stream Profiler 214, using its profiling CEP engine 216 (which may include processing resources such as, for example, at least one processor, a memory, non-transitory computer readable storage media, etc.) analyzes those streams continuously. For instance, event-based profiling 218 is performed on input that corresponds to the streams of event sources referenced in the queries, and query-based profiling 220 is performed on the query registration stream. The profiling CEP engine 216 stores the resulting profiles to profile databases or stores 222 and 224 (which may, for example, be backed by non-transitory computer readable storage media), respectively. These profile databases 222 and 224 in turn can be accessed from the development environment 206 via a dedicated profile query interface 226. As noted above, the stream repository 228 of certain example embodiments maintains metadata about relevant event streams accessed by CEP users.

The subsequent sections describe these components and interactions in greater detail. For the sake of simplicity, the FIG. 2 example architecture contains only one production CEP system 208. It will, however, be appreciated that the techniques described herein may be used in connection with multiple production CEP systems. Furthermore, it will be appreciated that the entire system may be implemented with a single CEP engine in certain example embodiments, e.g., if that single CEP engine were able to deal with the loads of profiling every relevant event stream, analyzing its own query registration events (e.g., through internal coding, an event feedback loop, and/or the like), and dealing with its usual CEP tasks. Complex extensions to the CEP engine may be added in this regard. It also will be appreciated that although a single IDE 206, this single IDE 206 may be used in connection with one or more production CEP systems. Alternatively, or in addition, different IDEs may be provided to different production CEP systems.

Deployment of Queries

Figure 3:
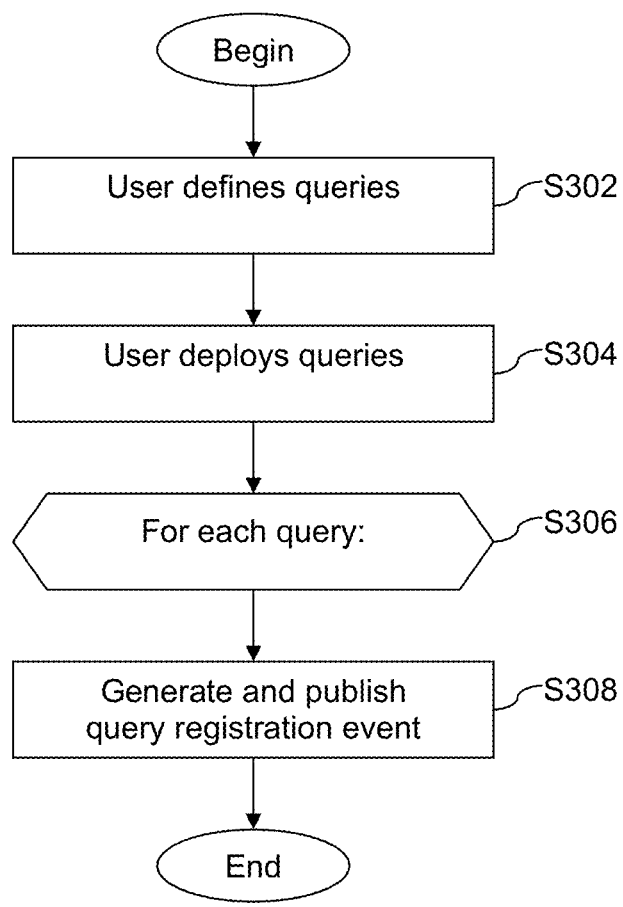
FIG. 3 is a flowchart summarizing query deployment steps involved in certain example embodiments.

FIG. 3 is a flowchart summarizing query deployment steps involved in certain example embodiments. Although the description provide below focuses to some extent on query registrations, it will be appreciated that query updates and deregistrations may be handled in an analogous manner.

The user defines in the development environment a set of continuous queries (step S302 in FIG. 3) and then deploys them to the production CEP system (step S304). The production CEP system receives that set and registers each of those queries and also deregisters queries marked for deregistration. For each query to be registered, deregistered, or updated, a new query registration event is produced (step S306). This event may comprise, for example, a data payload including a query identifier, query string, type of query registration (e.g., register, deregister, update, etc.), a user id, user group, etc. Temporal information also may be provided with the event. The temporal information may include a timestamp indicating when the query registration, deregistration, or update has been executed in the CEP production system, etc.

The event may be published (step S308) in accordance with any suitable language such as, for example, XML. An example XML-based representation for registering a filter query called "FilterQuery" that analyzes Stream1 for attribute1 therein equaling 50 is provided in FIG. 4.

Once the query registration event has been created, the production CEP system publishes it on the event bus. The resulting query registration stream typically has a low frequency, as continuous queries typically are long-running and the number of CEP developers authorized to set up and deploy new queries typically is limited. The Stream Profiler subscribes to the resulting query registration stream.

Query-Based Profiling Using the Stream Profiler

Figure 5:
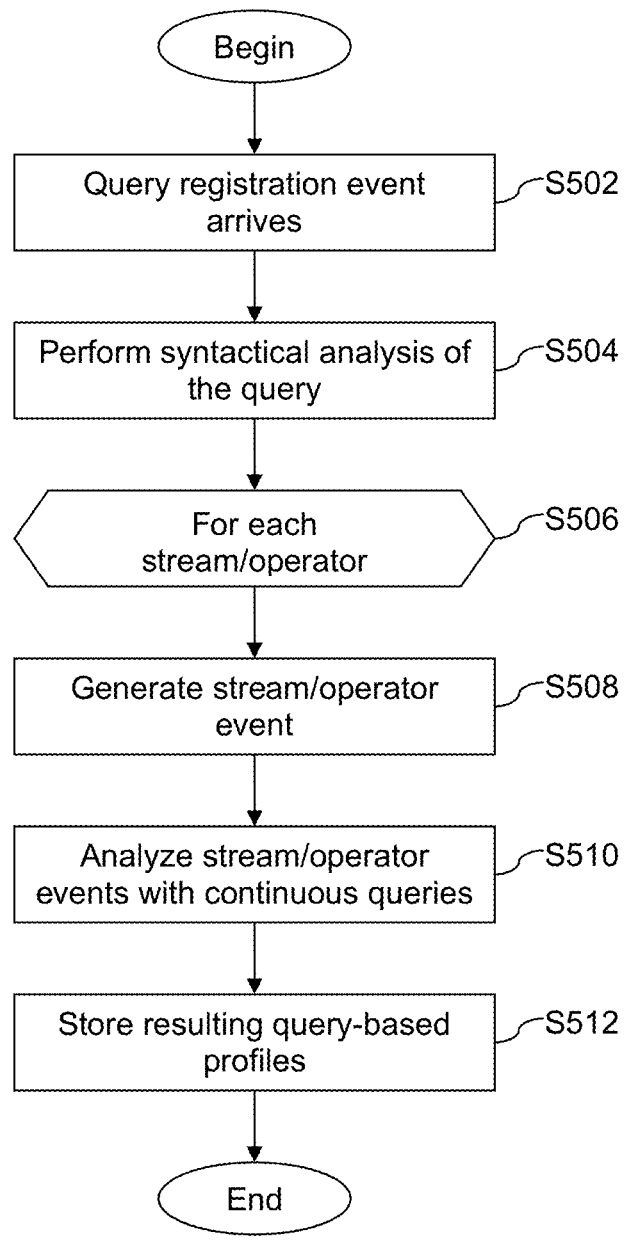
FIG. 5 is a flowchart summarizing query-based profiling steps that may be used in connection with certain example embodiments.

The stream profiler of certain example embodiments may use an internal CEP system to process the incoming streams, including the query registration stream. This architecture helps ensure that the query profiles are always up to date. FIG. 5 is a flowchart summarizing query-based profiling steps that may be used in connection with certain example embodiments. As will be appreciated from FIG. 5, and as set forth in greater detail below, an incoming query operations event may trigger two actions in certain example embodiments. First, with the above-described mechanism, relevant query profile information may be derived. Second, the profiling of involved event streams may be triggered.

In case a query registration event arrives (step S502 in FIG. 5), the following steps may be executed. An operator (e.g., a dedicated operator) runs a syntactical analysis of the query registration event (step S504). It may determine, for example, the referenced streams, the window sizes assigned to the streams, the related SQL operators, the attributes being used by the operator, the user id, the user group, etc. In the case of queries over multiple streams, like join or union queries, the other event streams may be included in this analysis as well. For certain operators like join or filter, additional characteristics like the join and the filter predicate may also included as appropriate.

For each stream/operator combination (step S506), a new event is produced (step S508). Thus, for one query registration event, most likely multiple stream/operator events will be generated as queries can include multiple streams and operators. A positive/negative approach may be used in connection with the temporal information of such an event. The positive/negative approach is an approach to model the temporal validity of events in an event stream. The temporal validity defines when an event has been valid. In the positive/negative approach, two events define the validity of an event. The first event, which is provided with a timestamp and a plus sign (for example), indicates that the event becomes valid at that timestamp. The second event, which is provided with a timestamp and a minus sign (for example), indicates that the event becomes invalid at that timestamp. Thus, if a query has been registered, the event becomes valid at the given timestamp, which may be denoted using a symbol such as a plus. If a query has been deregistered, the event becomes invalid at the given timestamp, which may be denoted using a different symbol such as a minus.

FIG. 6 illustrates how a query registration event can be split into three different stream/operator events in accordance with certain example embodiments. The resulting stream of that split operation describes in which time periods a stream is analyzed by which operator and with which settings. This stream in turn can be analyzed by continuous queries to derive the query-based profile information of a stream (step S510 in FIG. 5). The continuous queries can be configured to derive profile information for a partitioned time axis. For example, the time axis may be partitioned into one hour partitions, and the queries may continuously compute for each of those partitions the relevant profile information.

The following list shows how example continuous queries can be used to derive profile information for a stream:

Number of queries referring to that stream in the last hour:

```
SELECT COUNT(*) , StreamID
FROM QueryRegistration WINDOW(RANGE 1 HOUR SLIDE 1 HOUR)
GROUP BY StreamID
```

Number of queries using a join over that stream in the last hour:

```
SELECT COUNT(*), StreamID
FROM QueryRegistration WINDOW(RANGE 1 HOUR SLIDE 1 HOUR)
WHERE OperationType='join'
GROUP BY StreamID
```

Filter queries using attribute1 of the event stream in the filter predicate:

```
SELECT *
FROM QueryRegistration
GROUP BY StreamID
WHERE filterpredicate LIKE '%attribute1%'
```

Minimum, maximum, average window size per stream in the last hour:

```
SELECT MIN(windowSize),
    MAX(windowSize),
    AVERAGE(windowSize),
    StreamID
FROM QueryRegistration WINDOW(RANGE 1 HOUR SLIDE 1 HOUR)
GROUP BY StreamID
```

It will be appreciated that other time ranges in connection with these and/or other example queries may be applied. Furthermore, it will be appreciated that other queries may be used to derive the same, similar, or different information, in different example implementations. In this regard, the foregoing list provided some examples for profile information that might be of interest to a CEP developer. In a similar manner, more complex information can be derived for the different streams. More complex inquiries might include, for example:

Which were the top 5 streams with respect to the number of references in queries in the last hour?

Which was the attribute most often used in a join predicate in the last hour?

Given a stream, which were the three other streams it was most often joined with over the last hour?

Which were the attributes most often referred to in the last hour?

Which operators were used most often in the last hour?

Which user groups most frequently accessed a given stream?

Were the filter predicates for a stream more refining or more coarsening in the last hour?

It will be appreciated that, overall, the stream profiles provide a detailed analysis concerning how the streams have been analyzed over time.

As described above, this profile information is continuously computed over time, with each time partition having a separate profile. The profile information and its associated temporal relevance are then stored in a profile database (step S512 in FIG. 5). An example XML-based representation of an illustrative query profile in accordance with an example embodiment is provided in FIG. 7. This database is designed to efficiently support temporal queries (such as, for example, a query to determine the profile information for the transaction stream for the timeframe 3 pm to 4 pm at the first of July 2014). The database may be append-only in certain example embodiments, such that each new profile is added without updating previous profile information. As the number of profiles is continuously increasing, the memory consumption of the profile database also increases. Therefore, from time-to-time, the oldest profiles may be removed in order to free-up resources. However, as explained above, the number of developers (de)registering or updating continuous queries typically will be limited. Thus, the query operation streams will typically not produce high volumes and therefore it may seldom be necessary to delete old profiles from the profile database. In addition, or as an alternative, to removing old profiles, profiles that are not used for a predefined time period, profiles associated with deregistered streams, and/or the like, may be removed, as they may not longer be relevant.

Event-Based Profiling using the Stream Profiler

Figure 8:
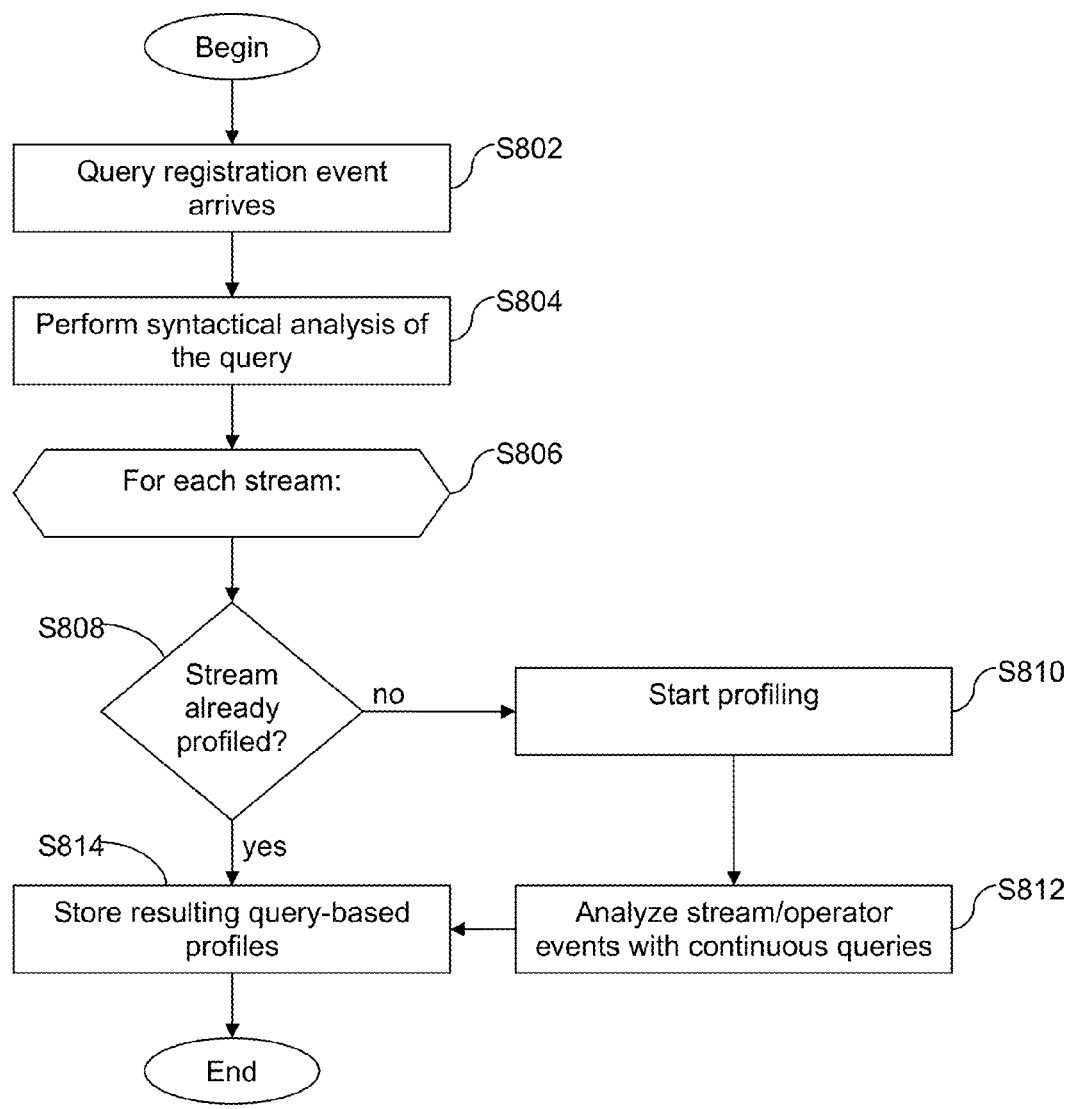
FIG. 8 is a flowchart summarizing event-based profiling steps that may be used in connection with certain example embodiments.

FIG. 8 is a flowchart summarizing event-based profiling steps that may be used in connection with certain example embodiments. It will be appreciated from FIG. 8 that, overall, the stream profiler in certain example embodiments may maintain in its profile databases event-based and query-based profiles that give a concise overview how a stream has behaved in the past and by which means it has been analyzed by other users. When a query operation event arrives (step S802 in FIG. 8), syntactical analysis is performed (step S804) to help reveal which streams are referenced in the query. For each of those streams (step S806), a check is made to determine whether they are already profiled (step S808). If they are not yet profiled, event-based profiling is started (step S810).

The internal CEP engine of the stream profiler of certain example embodiments subscribes to that stream by connecting to the corresponding channel on the event bus. The CEP engine continuously runs a series of mining and analysis tasks (e.g., step S812), e.g., to help reveal hidden characteristics of the event stream. Because of the likelihood of a high volume of event streams being involved in the analysis, it would be desirable to help ensure that such mining techniques comply with the CEP processing paradigm in the sense that they be online computable (e.g., computable in real-time or close to real-time).

For the most common mining techniques, the research area of stream mining presents counterparts that are online computable. In any event, the following list includes example characteristics of potential interest and provides example techniques that can be applied to reveal such characteristics:

Basic descriptive statistics: Given a numerical attribute, basic statistical descriptions can be computed. This may include, for example, minimum and maximum, median, average, variance, standard deviation, etc. These statistics can provide a concise overview of central tendencies and dispersions of the attribute values. They can be computed with continuous queries.

Distribution of the data: Different techniques are available for computing the distribution of an attribute, e.g. histograms, kernel density estimators (KDEs), etc. Besides computing the distribution for one attribute, the distribution of multiple attributes can also be computed. The visualization of such a distribution may provide a compact summary of the main behavior of the attribute values, e.g., in which regions there are many values, where there are the modes, where there are the sparse regions, whether the values are skewed, etc.

Dependencies between attributes: Regression-based techniques can be used to determine dependency structures between attributes, e.g., how the values of one attribute determine the values of other attributes, etc. Logit/probit and/or other techniques may be used, as well. Alternatively, or in addition, a factor analysis or correlation matrix can be used to determine relationships between attributes.

Detection of outliers: Outlier analysis techniques can be used to determine attribute values that differ significantly from the other values.

Detection of trends and seasonality: Time series analysis can be utilized to capture the constituting structure of a numerical attribute. Autocorrelation is one example that may be used in this regard.

It will be appreciated that there are a multitude of other techniques that may be used in place of, or together with, these examples. For instance, techniques such as clustering, classification, frequent item set mining, and/or the like, can be applied in certain example embodiments. They also may be used to help derive a concise and meaningful model of an event stream, its attributes, the relations between them, etc.

An example XML-based representation of an illustrative stream profile in accordance with an example embodiment is provided in FIG. 9. As with the query-based profiles discussed above, the event-based profiles may be determined in an online manner, and the resulting profiles may be stored in a profile database (step S814 in FIG. 8). This database analogously allows a user to browse through the history of the stream and to examine profiles of older segments of the stream. Again, the profiles may be determined for partitions of the event stream. It is noted that if a determination is made in step S808 that the stream has already been profiled, the process may move more directly to the storage referenced in step S814.

To help capture short-term and long-term tendencies of the monitored event stream, profiles for different partition sizes may be computed (e.g., in parallel). For example, the profiles may be based on a one hour sliding window, a 12 hour sliding window, a one day window, a one week window, and a one month window. Having those profiles for different partition sizes may allow for a fine-grain analysis of the stream's development. The following table illustrates the development of the average price for different time partitions for a hypothetical use case.

| Timeframe | Average Value |
| --- | --- |
| 1 week | 17.23 |
| 1 day | 17.96 |
| 1 hour | 18.49 |

It can be seen from the table that different profiles reveal that the price is slowly increasing over time, as the one week average is lower than the one day and the one hour average. Thus, the latest values seem to be increasing.

In order to allow for an efficient computation of the models for the multiple partitions and to save main memory resources, an additional approximation step for the partition values can be applied. The longer the partition reaches into the past, the more the events in that partition are approximated. The approximation step can be based on sampling. The longer the partition window, the higher the sampling rate may be. For example, the one hour partition need not be sampled, the one day partition may be sampled by 25%, the one week partition may be sampled by 50%, and the one month partition may be sampled by 75%. By implementing this example approach, the partitions being used for computing the profile information in different time resolutions may be of a moderate size. Alternatively, or in addition, a compression step may be used, e.g., with the compression ratio being higher the longer the partition window is.

The general profiling of event streams additionally or alternatively may be monitored with respect to the usage of streams. As profiling a multitude of high volume streams in parallel can be very resource intensive, the stream profiler of certain example embodiments may regularly check whether the event streams currently being profiled are still referenced within queries. This can be achieved by evaluating at regular points in time for each stream whether it is still referenced by at least one query. Alternatively or in addition, for each stream, a counter can be maintained within the stream profile that counts the number of queries currently referring to that stream. While registration of a query referring to that stream increases the counter, a corresponding deregistration decreases the counter. A count may be generated on-the-fly for the queries that are active.

Adding a timestamp in place of or in addition to that counter also can be used to track recent usage of the stream. A timestamp property also can be updated when a query registration or update event is emitted, for example. If a stream has not been referenced in queries within a certain timeframe, the stream profiler of certain example embodiments may stop profiling that stream, e.g., in case the current resource consumption is too high.

Besides automatically monitoring streams referenced in queries, it is also possible to profile an event stream not being referenced on-demand, e.g., if the user wants to get a better understanding of that stream.

Example User Interface to Stream Profiler

Figure 10:
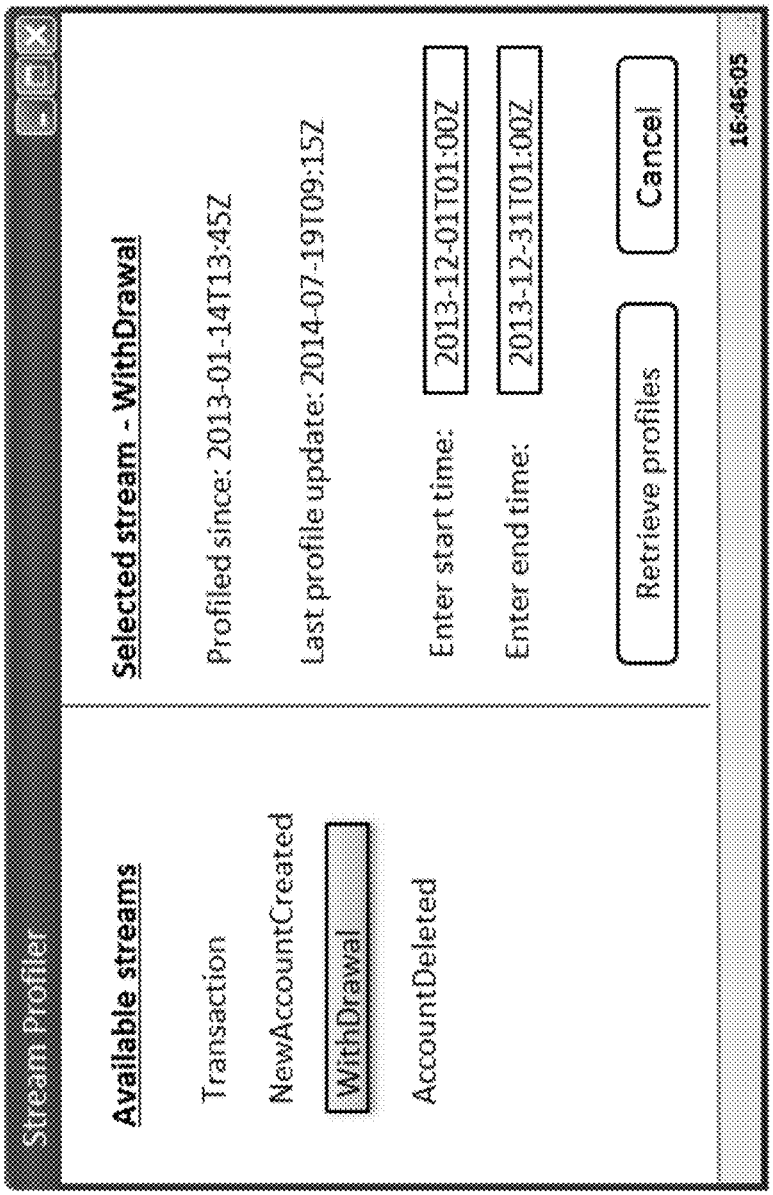
FIG. 10 is an example screenshot showing available streams that may be selected, and some high-level information for the "withdrawal" stream, in accordance with an example embodiment.

By connecting the stream profiler to the development environment, certain example embodiments enables the user to access the profiles of an event stream of interest and use them to gain a better understanding of that stream. For instance, as alluded to above, in certain example embodiments, the user can connect to the stream profiler and browse through the available streams in the development environment. The stream profiler thus may offer access to its stream repository, and the user may select a stream for investigation. FIG. 10 is an example screenshot showing available streams that may be selected, and some high-level information for the selected "withdrawal" stream, in accordance with an example embodiment.

If the user wants to retrieve profiles (e.g., by selecting the corresponding button in the FIG. 10 example screenshot), the request is sent to the stream profiler. The stream profiler checks in the internal profile databases which timeframes profiles for the selected stream are available. This timeframe information is sent back to the user. The user can decide the period(s) for which profile information should be retrieved. The user may define those periods separately for event-based and query-based profiles in certain example embodiments, as this may allow for a comparing of the effects of changing stream characteristics on the associated queries. For the selected periods, the stream profiler retrieves the profiles from the internal databases and gathers them, e.g., in an interactive profile report.

Figure 11:
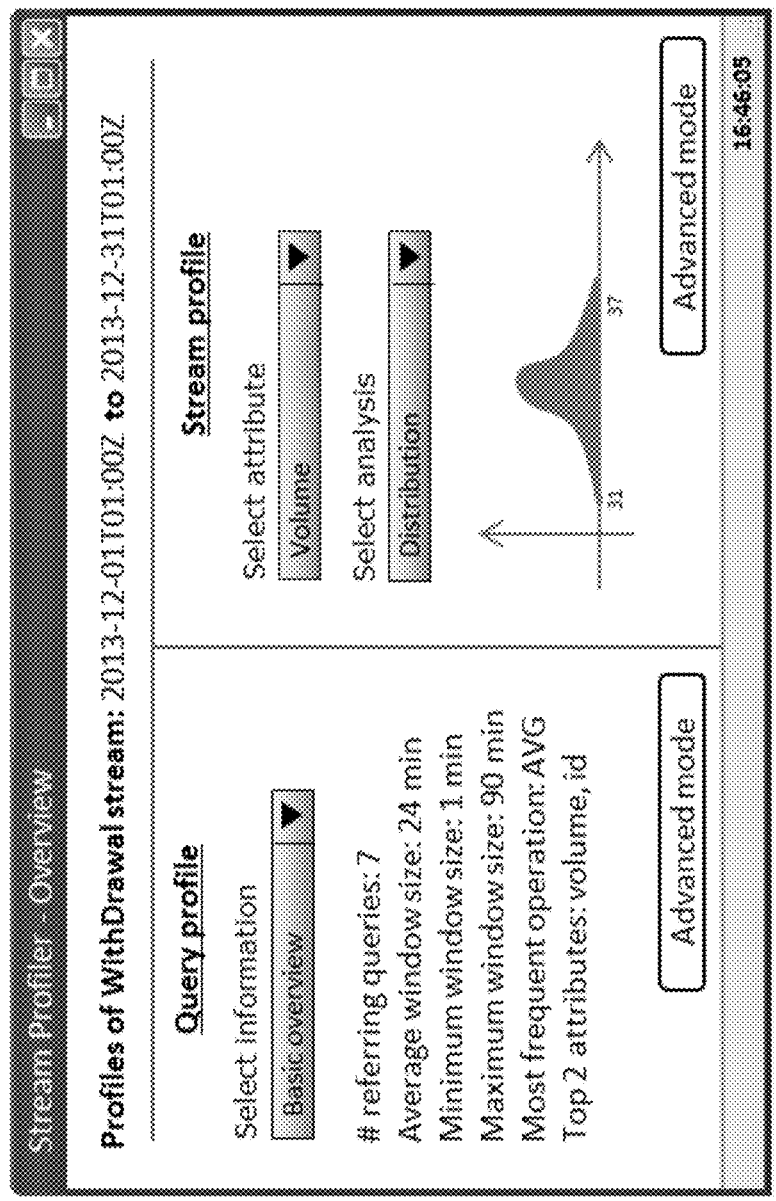
FIG. 11 is an example screenshot of a profile report for the withdrawal stream referenced in connection with FIG. 10 in accordance with certain example embodiments.

This report is sent to the development environment. The user can browse interactively through the report and examine the profile details for different time periods and time resolutions. Regarding visualization of that report, one suitable approach that may be used in connection with certain example embodiments involves the use of mash-up functionality. A mash-up provides an end-user with a friendly way of displaying key information, which can also include stream profiles. More frequently used queries and/or streams can be made larger relative to other queries and/or streams, presented earlier in a visualization, etc. FIG. 11 is an example screenshot of a profile report for the withdrawal stream referenced in connection with FIG. 10 in accordance with certain example embodiments.

In general, based on the stream investigation, the user may be provided with a concise picture of the stream, the ways the stream has been analyzed in the past, and/or the like, in certain example embodiments.

Example Use Case

The following example use case illustrates how a user can gain important knowledge from a stream investigation that uses the stream profiler of certain example embodiments. It will of course be appreciated that the example techniques set forth herein may be used in connection with a wide variety of different applications, streams, fields, etc. In any event, the application in this example is a bank that has specialized as a "loan factory" and, in this regard, customers can submit a loan application and quickly obtain an approval or disapproval message. In order to continuously improve the internal processes dealing with the loan applications, the bank has for the purposes of this example decided to analyze its processes with CEP technology. With a suitable CEP application for monitoring the internal processes, problems and bottlenecks can be detected and fixed in a timely manner.

The CEP application monitors different streams including, for example, the stream of incoming loan applications, the stream of application processing updates, and the stream of (dis)approvals. Different continuous queries are used to continuously analyze those streams. The CEP application is extended by additional analysis logic, e.g., in accordance with the example techniques described herein. With this analysis logic, the loan applications are to be clustered so that for each cluster, tailored processes based on the cluster characteristics can be defined.

As a first step, the CEP developer wants to investigate the characteristics of the involved streams in the last year. The CEP developer thus uses the development environment to connect to the stream profiler and requests the profiles for the stream of incoming loan applications for the last year. Assume further that the CEP developer wants to use the stream profiles to determine those applications with a significantly higher loan volume than normal. For the corresponding query, the CEP developer needs to know the threshold for classifying the loan volume as high, medium, or low. The CEP developer therefore examines the query-based profiles of the last year and examines the ranges of filter predicates of all filter queries filtering on loan volume. This analysis reveals that at the beginning of the year, the filter predicates mostly used a threshold of $43,000, whereas the filter predicates mostly used a threshold of $49,000 in the last month.

The CEP developer next examines the event-based profile, e.g., comparing the distribution of the loan volume at the beginning of the year and in the last month. The distribution beginning of the year is one-modal with an average of $11,000 and a 95% percentile of $41,980. The distribution of the last month differs slightly. It is bimodal with the center of the first mode around $10,500 and the center of the second mode around $44,300. A comparison with the other distributions reveals that the second mode has been slowly established in the last three months. Thus, it seems that the loan volumes recently involve two clusters. This is also reflected in the filter queries with the filter predicate threshold slowly increasing in the vicinity of the second mode. Therefore, the CEP developer defines filter queries that separate incoming loan applications into two classes, with each class reflecting one mode of the volume distribution.

Next, the developer examines in the query-based profile with which streams the loan applications stream have been joined. In the past, this was most often the (dis)approval stream. This inspires the developer to examine the relationship between high loan volumes and disapprovals. A closer examination reveals that applications of male applicants between 22 and 26 years old and high loan volumes have a high probability of disapproval.

The CEP developer then refines the cluster filtering queries to reflect this new insight. Besides loan volume, age, and gender, the CEP developer checks in the profiles which other attributes are relevant. According to the query profiles, another attribute often used is the application filing format, e.g., indicating whether the application filed by mail, fax, email, website, etc. A factor analysis in the event-based profiles confirms that this is a relevant attribute, so the CEP developer includes that information in further analysis.

Before putting the new analysis queries into production, the CEP developer examines the event-based and the query-based profiles of the last year to check whether there are any abnormalities or seasonalities that require further query adaptations.

Overall, by investigating the event streams beforehand, the CEP developer was able to derive relevant characteristics of the event stream, which may serve as a well-defined starting point for complex analyses. This is a huge benefit compared to analyzing the streams without any prior knowledge as to how to analyze them.

Further Example Features

Certain example embodiments may incorporate some or all of the following and/or other features, e.g., to extend and/or otherwise build upon the techniques set forth herein:
  Integration of non-streaming sources: In many CEP applications, streaming event sources may be analyzed together with other sources that have a static nature. This may include, for example, data stored in databases and caches. Similar to the profiling of event streams, these additional sources also can be profiled with the same means. This may provide the user with a more holistic view of the characteristics of the sources of potential interest and to be/being analyzed.
  Application to query output streams: The same mechanisms to profile event sources can in certain example embodiments be leveraged to derive profiles of query output streams. These profiles can be used to gain a better understanding of the query in some instances.
  Knowledgebase for optimizer: The optimizer in a CEP system generally is responsible for determining the most efficient execution plan for the currently registered queries. These optimization tasks can use the stream profiles of the stream profiler in certain example embodiments in order to gain deeper insights into the streams. For example, by knowing how a stream behaves, the optimizer can rearrange queries over that stream so that the overall execution plan is better optimized.
  Profile access to metadata of stream profiler: The stream profiler in certain example embodiments may additionally track how the stream profiles are accessed by users. This metadata can be used to determine the most popular stream profiles. For these stream profiles, the accuracy of the profile information can be improved and, for example, the fineness of the granularity can be increased as the profile information is computed. Similarly, the profile accuracy of less frequently accessed profiles can be reduced.
  Profile access in queries: The query interface can be extended so that the user can access relevant information being available in profiles within the queries in certain example embodiments. For that purpose, the profile may be made accessible using a suitable reference notation. Alternatively, or in addition, the query optimizer can be extended so that it automatically detects when a query includes constructs that are identical to profile information.
  Connection to query recommendation systems: The stream profiler of certain example embodiments can be used as a knowledgebase for query recommendation systems in certain example embodiments. These systems may recommend queries to the user, e.g., based on historic knowledge of typical queries. As the stream profiles provide a detailed overview of a stream's characteristics, the query recommendation system can use that information to align its recommendations to the input streams.
  Connection to monitoring framework: The monitoring framework presented in EP 13 191 743.7, filed on Nov. 6, 2013, the entire contents of which are hereby incorporated herein by reference, uses a CEP system and statistics to monitor a production CEP system. The framework can be complemented by the stream profiler of certain example embodiments. For example, as the stream profiler provides details on the behavior of a stream and associated continuous queries, the monitoring framework can use that information to anticipate changes in the query workload it monitors. For the case of changing stream characteristics, the stream profile can provide insights into which extent this also reflects in the queries. Thus, if the monitoring framework detects changing characteristics, it can forecast how this might affect the currently running queries.

It will be appreciated that as used herein, the terms system, subsystem, service, engine, module, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:
1. A method of profiling one or more event streams using a profiling computer system that includes at least one hardware processor, the one or more event streams delivered via an event bus that is implemented using the at least one hardware processor, the method comprising:

receiving, via the event bus and at the profiling computer system, input events from the one or more event streams emitted to the event bus, the input events also being delivered to at least one production complex event processing (CEP) system;

receiving, via the event bus and at the profiling computer system, query registration-related events from a registration event stream emitted to the event bus, the query registration-related events being generated in response to registration of queries with the at least one production CEP system that are executed thereon against specified ones of the one or more event streams using at least one operator, wherein each query registration-related event includes a reference to at least one of the one or more event streams and operator data that corresponds to how a query that corresponds to the query registration-related event will be executed by the production CEP system;

developing event-based profiles by subjecting the received input events of the one or more event streams to a profiling complex event processing (CEP) engine that is executing using the at least one hardware processor of the profiling computer system, the event-based profiles including data mining related characteristics and/or statistical characteristics for each of the one or more input event streams;

in response to reception of each query registration-related event, generating, using the profiling computer system, a plurality of events, wherein each of the plurality of events is based on a different one of plural operators of the query that corresponds to the query registration-related event;

developing query-based profiles by subjecting the generated plurality of events to the profiling CEP engine, the query-based profiles including data indicative of how relevant the queries performed on the one or more input event streams are and/or how those queries are relevant to the one or more input event streams on which they are performed; and storing the event-based profiles and the query-based profiles to a non-transitory computer readable storage medium.

2. The method of claim 1, further comprising maintaining different event-based profiles and different query-based profiles for different timeframes in the non-transitory computer readable storage medium.

3. The method of claim 1, further comprising storing, to a stream repository, metadata about the one or more event streams accessed by a user of the production CEP system.

4. The method of claim 3, further comprising creating a new entry in the stream repository each time the production CEP system is connected to a new input event stream.

5. The method of claim 3, further comprising enabling a user of production CEP system to browse through query-based profiles and/or event-based profiles for input event streams for which there are entries in the stream repository.

6. The method of claim 5, further comprising (a) automatically removing profiles for queries and/or input event streams deemed irrelevant, and/or (b) organizing queries and/or input event streams based on relevance.

7. The method of claim 1, wherein at least some of the queries are continuous queries.

8. The method of claim 1, further comprising deriving at least some of the query-based profiles from query registration-related events without also taking into account information associated with the input events on which the queries associated with the query registration-related events operate.

9. The method of claim 1, wherein each said query registration-related event includes a query identifier, a query string, a type for the respective query registration-related event, and time-related information.

10. The method of claim 1, wherein the developing of the query-based profiles further comprises:

analyzing each received query registration-related event to identify at least each input event stream referenced and/or implicated therein, and each operator involved in the associated query; and analyzing each operator/stream combination in developing the query-based profiles.

11. The method of claim 10, wherein the analyzing of each operator/stream combination is performed in connection with a continuous query.

12. The method of claim 1, further comprising making profiles available to stream profiler interface accessible via a development environment that is usable in CEP query definition and deployment.

13. A non-transitory computer readable storage medium tangibly storing a program for profiling one or more event streams using a profiling computer system that includes at least one hardware processor, the one or more event streams delivered via an event bus that is implemented using the at least one hardware processor, the program including instructions that, when executed by processing resources including at least one processor of a computer system, at least:

enable reception, via the event bus and at the profiling computer system, of input events from the one or more input event streams emitted to the event bus, the input events also being delivered to at least one production complex event processing (CEP) system;

enable reception, via the event bus and at the profiling computer system, of query registration-related events from a registration event stream emitted to the event bus, the query registration-related events being generated in response to registration of queries with the at least one production CEP system that are executed thereon against specified ones of the one or more input event streams using at least one operator, wherein each query registration-related event includes a reference to at least one of the input event streams and operator data for plural operators that are part of a corresponding query for the production CEP system;

develop event-based profiles by subjecting the received input events of the one or more event streams to a profiling complex event processing (CEP) engine that is executing using the at least one hardware processor of the profiling computer system, the event-based profiles including data mining related characteristics and/or statistical characteristics for each of the one or more input event streams;

in response to reception of each query registration-related event, generate, using the profiling computer system, a plurality of events, wherein each of the plurality of events is generated based on at least one of the plural operators of the query that corresponds to the query registration-related event, where each of the plural operators is used to generate at least one of the plurality of events;

develop query-based profiles by subjecting the generated plurality of events to the profiling CEP engine, the query-based profiles including data indicative of how relevant the queries performed on the one or more input event streams are and/or how those queries are relevant to the one or more input event streams on which they are performed; and store the event-based profiles and the query-based profiles to a non-transitory computer readable storage medium.

14. A stream profiler computer system, comprising:

a communications interface that is coupled to an event bus over which events are receivable; and a processing system that includes at least one hardware processor, the processing system configured to:

execute a profiling complex event processing (CEP) engine;

receive, via the event bus, input events from one or more input event streams emitted to the event bus, the input events also being delivered to at least one production complex event processing (CEP) system that is separate from the stream profiler computer system;

receive, via the event bus, query registration-related events from a registration event stream emitted to the event bus, the query registration-related events being generated in response to registration of queries with the at least one production CEP system, the queries being executed against the one or more input event streams, where at least a first query of the queries is composed of plural query operators, wherein each query registration-related event includes a reference to at least one of the input event streams and operator data, where a first query registration-related event includes operator data for the plural query operators that are part of the first query used by the production CEP system;

develop event-based profiles based on the received input events, the event-based profiles including data mining related characteristics and/or statistical characteristics for each of the one or more input event streams;

in response to reception of each query registration-related event, generate a plurality of events that are each based on at least one of plural different operators from a corresponding query, wherein each one of a first plurality of events are generated for, and based on, a corresponding operator of the plural query operators that compose the first query;

develop query-based profiles from the received query registration-related events, the query-based profiles including data indicative of how relevant the queries performed on the one or more input event streams are and/or how those queries are relevant to the one or more input event streams on which they are performed; and store the event-based profiles and the query-based profiles to a non-transitory computer readable storage medium of the stream profiler computer system.

15. The system of claim 14, wherein different event-based profiles and different query-based profiles are derived for different timeframes and stored to the non-transitory computer readable storage medium.

16. The system of claim 14, further comprising a non-transitory stream repository configured to store metadata about the one or more input event streams accessed by a user of the production CEP system.

17. The system of claim 16, further comprising an interface to a development environment over which a user of the production CEP system can browse through query-based profiles and/or event-based profiles for input event streams for which there are entries in the stream repository.

18. The system of claim 17, wherein the development environment is usable in connection with CEP query definition and deployment to the production CEP system.

19. The system of claim 14, wherein at least some of the queries are continuous queries.

20. The system of claim 14, wherein at least some of the query-based profiles are derived from query registration-related events without also taking into account information associated with the input events on which the queries associated with the query registration-related events operate.

21. The system of claim 14, wherein each said query registration-related event includes a query identifier, a query string, a type for the respective query registration-related event, and time-related information.

22. The system of claim 14, wherein the query-based profiles are developed by at least:

analyzing each received query registration-related event to identify at least each input event stream referenced and/or implicated therein, and each operator involved in the associated query; and analyzing each operator/stream combination in developing the query-based profiles.

23. The system of claim 22, wherein the analyzing of each operator/stream combination is performed in connection with a continuous query.

24. A system, comprising:
the event bus,
the production CEP system,
a development environment, and
the stream profiler computer system of claim 14.

* * * * *